United States Patent
Aragon, Jr.

[11] Patent Number: 5,182,873
[45] Date of Patent: Feb. 2, 1993

[54] MOTION SENSITIVE, FIBER OPTIC, STRIKE INDICATING FISHING ROD ASSEMBLY

[76] Inventor: William G. Aragon, Jr., 3181 W. 36th Ave., Denver, Colo. 80211

[21] Appl. No.: 467,675

[22] Filed: Jan. 19, 1990

Related U.S. Application Data

[63] Continuation-in-part of Ser. No. 137,872, Dec. 24, 1987, abandoned.

[51] Int. Cl.$^5$ .............................................. A01K 97/12
[52] U.S. Cl. ........................................ 43/17; 43/18.1; 43/17.5
[58] Field of Search ............... 43/18.1, 18.5, 23, 17.5, 43/17, 22

[56] References Cited

U.S. PATENT DOCUMENTS

| | | | |
|---|---|---|---|
| 3,238,659 | 3/1966 | Lamb, Jr. | 43/17 |
| 3,862,509 | 1/1975 | Peterson, Jr. | 43/17.5 |
| 4,026,059 | 5/1977 | Ochs | 43/17.5 |
| 4,376,349 | 3/1983 | Yarczower | 43/17 |
| 4,384,425 | 5/1983 | Lemons, Sr. | 43/17 |
| 4,422,258 | 12/1983 | Adams et al. | 43/17 |
| 4,519,158 | 5/1985 | Kirk | 43/17 |
| 4,541,195 | 9/1985 | Delaney | 43/17 |
| 4,586,284 | 5/1986 | Westwood, III | 43/17 |
| 4,590,701 | 5/1986 | Rivers | 43/17 |
| 4,930,243 | 6/1990 | Lowe | 43/17 |

Primary Examiner—Kurt C. Rowan
Attorney, Agent, or Firm—John E. Reilly

[57] ABSTRACT

In a fishing rod assembly, a motion detection apparatus is mounted in the rod and includes a motion detector to sense any motion or tension in the line imparted to the rod when a fish strikes and to generate an electrical signal in response to such motion, a portable power supply, a light source and circuit control means responsive to the signal produced by the motion sensor to activate the light source, and a plurality of fiber optic elements are arranged for extension through the rod to produce a visual signal along the length of the rod when the light source is activated; and further the circuit means may include an audible alarm which is responsive to the same signal to produce an audible signal when motion is sensed in the rod.

14 Claims, 3 Drawing Sheets

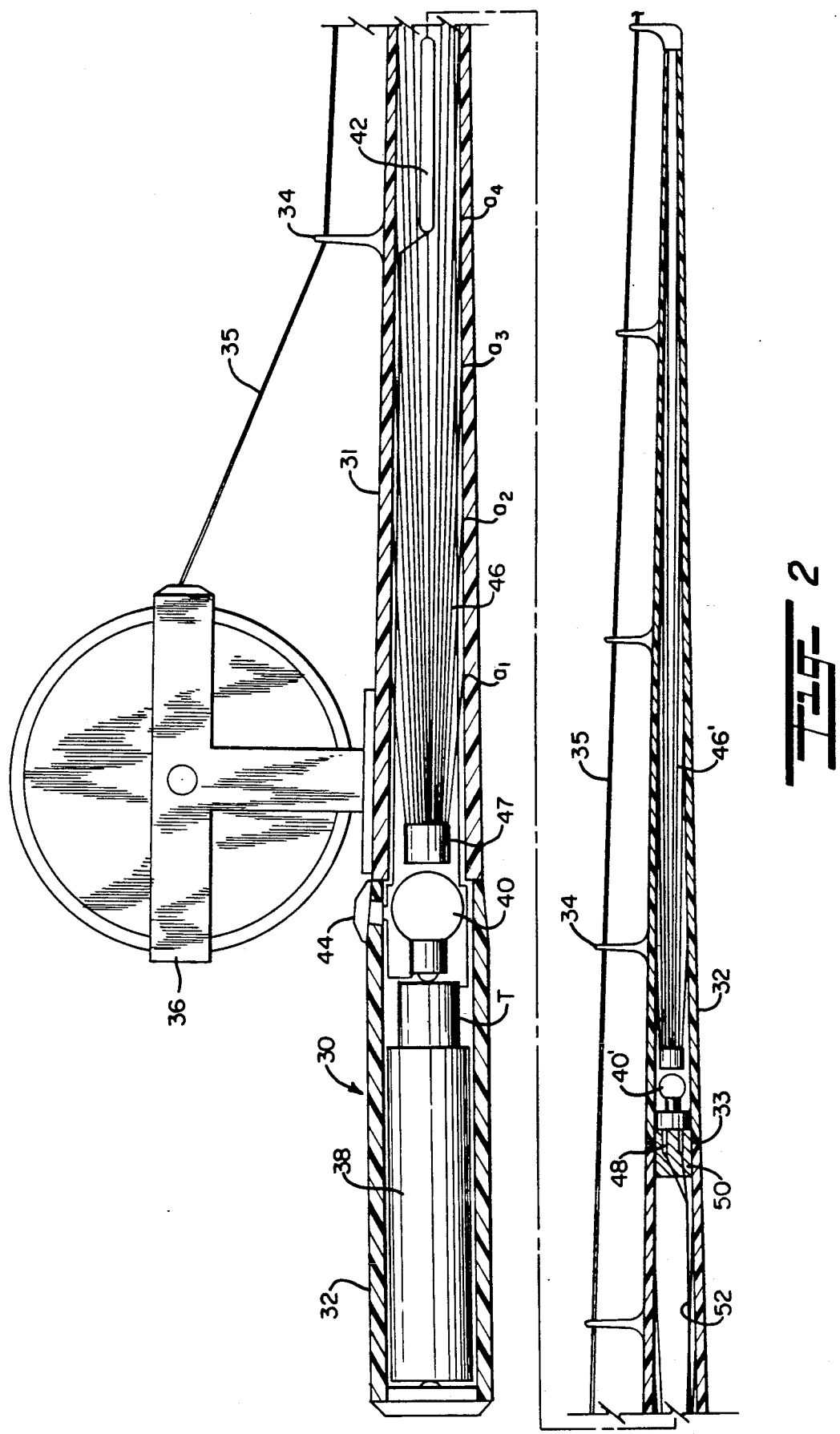

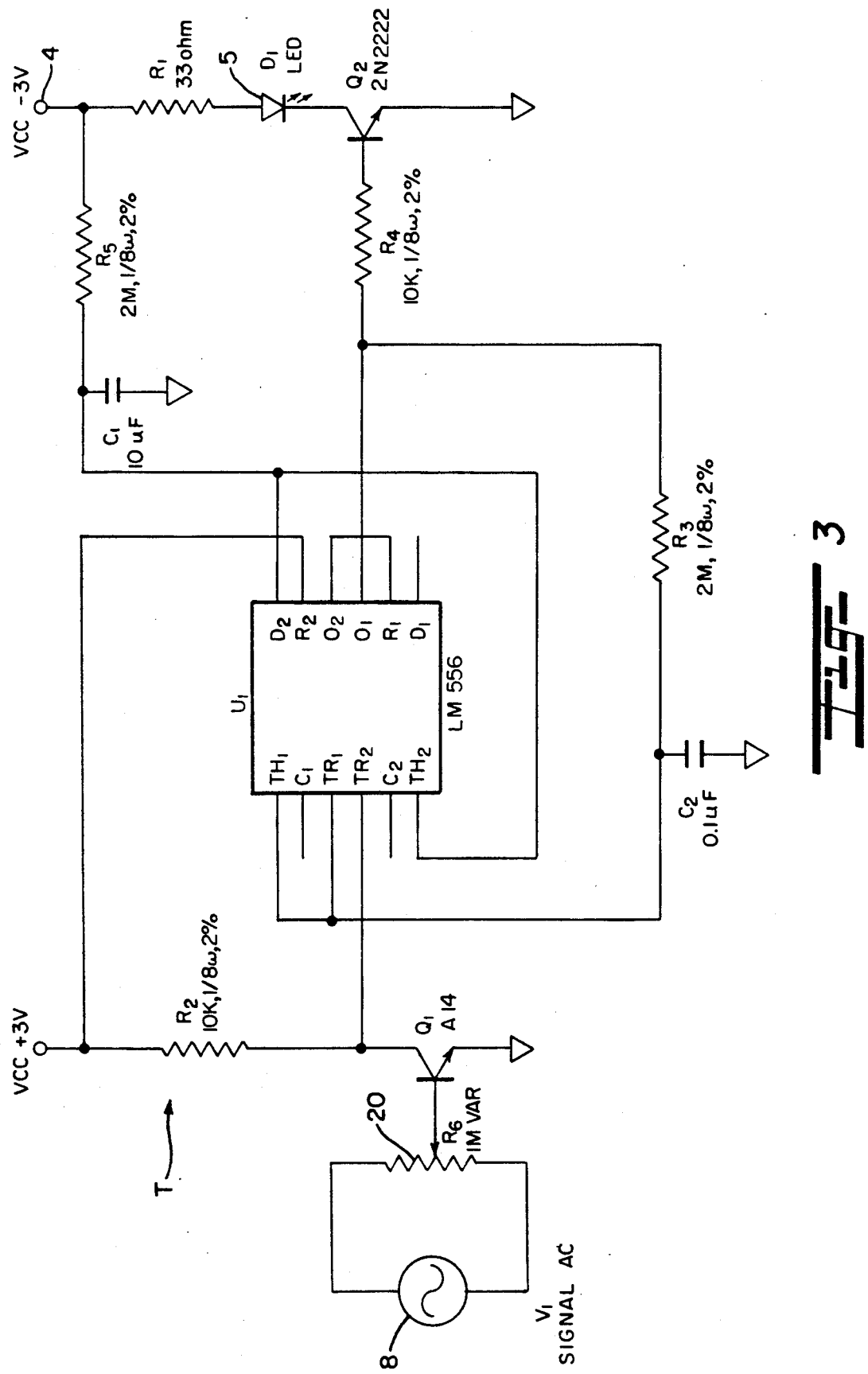

1

MOTION SENSITIVE, FIBER OPTIC, STRIKE INDICATING FISHING ROD ASSEMBLY

CROSS REFERENCE TO RELATED APPLICATIONS

This is a continuation-in-part application of Ser. No. 137,872, filed Dec. 24, 1987, by William G. Aragon, Jr. and entitled MOTION AND TENSION SENSITIVE, FIBER OPTIC, VISUAL INDICATING FISHING ROD ASSEMBLY, now abandoned.

This invention relates to fishing rod apparatus; and more particularly relates to a novel and improved apparatus of a type designed to provide an automatic indication to the fisherman that the fish has struck.

BACKGROUND AND FIELD OF INVENTION

Fishing is one of the oldest activities known to mankind. Over the years, innumerable devices, schemes and methods for attempting to catch both fresh and salt water fish have been devised. However, it is axiomatic that the most tried and true method of catching fish remains to be one of the oldest; that is, dropping a line bearing a baited hook into the water and ensnaring the fish upon the hook when the fish attempts to take the bait.

If the fisherman is engaged in some other activity when a fish strikes at the bait, a strike may go undetected and the fish escape, since it is often necessary to set the hook at the time the fish is nibbling. If the fisherman is otherwise engaged, the opportunity to set the hook will have passed. Additionally, while a fisherman may be able to observe the rod during daylight hours in order to see a strike, during hours of darkness no such opportunity exists particularly if the rod is unattended. Accordingly, there is a need for a practical manner and means for alarming or signaling a fisherman who is not directly engaged in watching or holding his fishing rod when a fish is nibbling or striking. In the past, it has been proposed to provide for some form of externally attached signaling device which will signal when a strike has occurred and, for example, reference is made to U.S. Pat. No. 3,238,659 to C. L. Lamb, Jr. in which the rod is provided with a pressure-activated, lighted alarm system. The system has a battery and a master switch in the handle of the rod and a signaling switch or pressure-sensitive detector is located in one of the eyelets through which the fishing line passes. When the line is pulled tight, such as, in the event of a strike, the pressure-sensitive detector contact is closed to cause a light switch to be energized and this light is transmitted through the translucent material of the rod, however it is highly desirable to obviate the use of externally mounted detectors or to limit the materials from which the rod can be constructed. Also it is desirable to provide signaling means which need not be oriented into a particular position in order to operate.

Another approach is disclosed in U.S. Pat. No. 4,422,258 to B. R. Adams et al wherein a fish strike signaling device can be attached to the rod and provide a signal indicating the strength of the pressure placed in the line. In U.S. Pat. No. 4,384,425 to Lemons, a switch and battery system either can be attached or built into the rod in such a way that an increase in tension will cause the switch to be triggered. Again, such devices are exposed to damage from handling and water damage as well. Other patents of interest are U.S. Pat. No. 4,590,701 to W. B. Rivers; U.S. Pat. No. 3,862,509 to J. W. Petersen, Jr.; U.S. Pat. No. 4,541,195 to E. A. Delaney; U.S. Pat. No. 4,519,158 to J. C. Kirk; U.S. Pat. No. 4,586,284 to S. M. Westwood, III and U.S. Pat. No. 4,026,059 to W. R. Ochs.

In accordance with the present invention, it is proposed to provide for a compact, lightweight signaling device that can be internally mounted within the rod and is capable of producing a bright visual signal and/or a loud audible signal to the fisherman in response to motion produced in the rod as a result of a potential fish strike.

SUMMARY OF INVENTION

It is therefore an object of the present invention to provide for a novel and improved fish strike indicating fishing rod assembly which is compact, lightweight and highly dependable in use.

Another object of the present invention is to provide for a novel and improved method and means for visually signaling to a fisherman any motion in the fishing rod indicating a potential fish strike with the use of light-transmitting elements; and further wherein the light-transmitting elements may be incorporated into rods of different designs and materials without affecting the performance of the rod.

A still further object of the present invention is to provide for a novel and improved fish strike indicating device for fishing rods which is capable of providing either a visual or auditory means of signaling a fisherman of motion in the line and wherein the signaling device can be completely integrated into the fishing rod and in such a way as not to be exposed to contamination or damage from handling.

In accordance with the present invention, there has been devised for use in a fishing rod assembly of the type having a rod and a plurality of eyelets through which a fishing line is passed of motion-sensing means for sensing the motion of the fishing rod and for providing an electrical signal in response to a motion in the rod, the motion sensing means being mounted internally of the rod; a portable power source and a light source at one end of the rod; circuit means mounted internally of the rod between the power source and the light source, the circuit means responsive to an electrical signal produced by the motion-sensing means to complete the circuit between the power source and the light source; and visual indicating means in the form of a plurality of elongated fiber optic elements extending from one end of the rod in proximity to the light source for transmitting light along the length of the rod in response to energization of the light source by the circuit means. Preferably, the light-transmitting, fiber optic elements vary in length from one end of the rod to the other so as to emit light at spaced intervals along the length of the rod; and when desired to construct the rod of an opaque material, the optic fibers may be embedded in the wall thickness of the rod and their ends ground flush with the external surface of the rod so as to emit a visual signal at spaced intervals along the length of the opaque rod.

The motion detector is preferably in the form of a piezoelectric crystal positioned at a point along the length of the rod which will best sense tension in the fishing line as imparted through the rod; and the circuit means is preferably a timer control circuit which is response to the signal produced by the piezoelectric crystal will generate a series of electrical pulses causing the fiber optic elements to flash at a predetermined rate; or, in the alternative, to activate an auditory alarm, such as, a buzzer which will beep at a predetermined rate.

In an alternate form of the present invention adapted for use with multi-sectioned rods, a light source and fiber optic elements are provided in each section and activated by the common circuit means in the handle of the rod through contact terminals between connecting ends of the rod sections.

BRIEF DESCRIPTION OF THE DRAWINGS

FIG. 2 is another somewhat fragmentary view of a modified form of invention incorporated into a sectional rod assembly; and FIG. 3 is a schematic view of a preferred form of timer circuit employed in the apparatus of FIG. 1.

DETAILED DESCRIPTION OF THE PREFERRED EMBODIMENT

Figure 1:
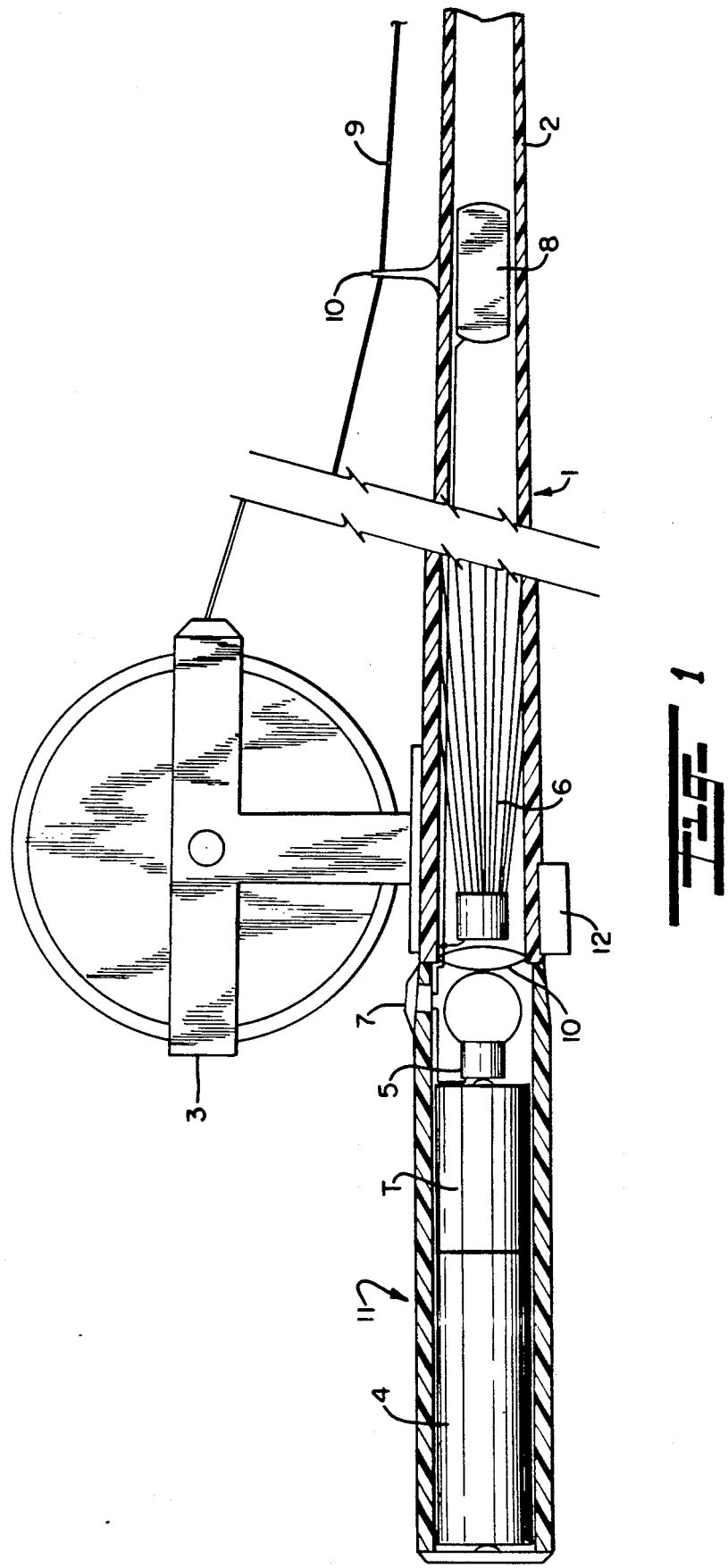
FIG. 1 is a somewhat fragmentary view in elevation of a conventional fishing rod assembly and schematically illustrating the mounting and disposition of a preferred form of fish strike apparatus in accordance with the present invention.

As shown in FIG. 1, the disclosed invention is a compact, lightweight fishing rod motion detection apparatus 1 which signals when the rod is vibrated or otherwise placed in motion as the result of a fish strike or nibble. In the preferred embodiment, the apparatus 1 is comprised of a rod 2, reel 3, a portable power supply 4, a radiant energy light source 5, a plurality of light-transmitting fiber optic elements 6, an on/off switch 7 and a motion detector 8.

As shown in FIG. 1, the reel 3, containing a spool of fishing line 9, is attached to the rod in the normal fashion, with a plurality of eyelets 10 for the guided passage of the fishing line 9 along the length of the rod 2. The light source 5 and the motion or vibration detector 8 are powered by the portable power supply 4.

As shown in FIG. 1, the portable power supply 4 is disposed in the handle 11. The portable power supply 4 may be of the rechargeable or the non-rechargeable type. The light source 5 is also placed in the handle of the rod 2 and is electrically connected to the power supply 4. The on/off switch 7 is placed near the handle 11 of the rod 2 in order to allow the apparatus 1 to be turned off when not in use. If desired, a prism or lens as designated at 10 may be interpositioned between the light source 5 and bundled ends of the element 6.

The motion detector 8, electrically powered by the portable power supply 4, is located in the rod 2, generally positioned approximately midway along the length of the rod 2. It is of a well-known design, closing an electrical circuit upon being vibrated or shaken with a predetermined force, such as, a fish strike. When the motion detector 8 closes the circuit, the light source 5 is energized and light is transmitted to the fiber optic elements 6. Preferably, the motion detector 8 is a piezoelectric crystal in the form of an extremely thin transducer strip on the order of 52 μM and, for example, may be a Piezo Film Transducer manufactured and sold by Pennwalt of Folsom, Calif. The transducer 8 may be secured in place either to the inner wall of the hollow rod, as shown in FIG. 1 or to the fiber optic strands extending through the rod as shown in FIG. 2. Typically, the crystal may extend on the order of 6" to 1' in length depending upon the sensitivity desired for sensing any motion or vibration imparted to the rod by the fishing line.

The rod has disposed along its interior passage a plurality of longitudinally embedded light-transmitting fiber optic elements 6, which in cooperation with the light source 5 transmits visible radiant energy along the full length of the rod. One end of the fiber optic elements 6 is in optical connection with the light source 5. The other ends of the fiber optic elements 6 are randomly dispersed throughout the length of the rod 2. As shown in FIG. 1, the rod 2 is constructed of a light transparent material which allows the light emitted by the fiber optic elements 6 to be visible.

When the light is transmitted through the fiber optic elements 6 the entire length of the rod 2 is thus lit and made quite visible in the dark and even in relatively bright sunlight. In the preferred embodiment, the fiber optic elements 6 will be of random lengths so that the light patterns will be visible throughout the entire length of the rod 2. Alternatively, the fiber optic elements 6 can be notched at random points along their lengths in order to have light emitted from those points along the rod 2.

Alternatively, the rod 2 can be constructed with the fiber optic elements 6 embedded in the rod 2 with the ends protruding from the rod material 2 and then having the exterior ground down so that the ends of the fiber optic elements 6 are flush with the exterior surface of the rod 2, thus allowing light to be transmitted directly out of the rod 2 along its full length.

Referring in more detail to FIG. 3, as noted earlier, the preferred form of motion sensor 8 is a piezoelectric crystal which when vibrated will produce a small electrical output current which is delivered to a timer circuit T. This current as produced by the crystal is dropped across a 1 megohm potentiometer 20. The output from the potentiometer 20 is connected to the base of a Darlington transistor $Q_1$. The sensitivity of the motion sensor 8 can be adjusted with the potentiometer 20 to allow for varying water and wind conditions. The collector of the transistor $Q_1$ is then applied to trigger the timer circuit designated at $U_1$ and which may consist of two timer sections: a first timer control selects the time that the alarm will signal by controlling a reset pin on the second timer. This resetting capability allows the alarm to sound continuously if there is continuing motion in the rod, for example, as may be caused by a fish continuing to strike. The second timer is permitted to operate only when the first timer is activated and controls the flash rate of the alarm.

The alarm itself may consist either of the light source 5, which suitably may be a light-emitting diode (LED), or other audible piezo-responsive audible alarm, such as, a buzzer circuit as designated at 12 in FIG. 1. The output of the second timer biases the transistor $Q_2$ to enable the selected alarm. This application requires the standby power consumption to be minimal to increase battery life and dictates the use of high impedance resistors as indicated in the RC circuits and CMOS timer chip as well as optimum biasing in the output alarm circuit. These constraints are all obtained with the use of an LM556 timer $U_1$ with two megohm resistors $R_5$ and $R_3$ in the RC networks, and a transistor-buffered output alarm driver $Q_2$. The resultant design is an extremely compact circuit which can be contained in a small chip or card and incorporated within the fishing rod handle to provide either an LED output to illuminate the optical fibers in the rod or to trigger an audible alarm.

DETAILED DESCRIPTION OF MODIFIED EMBODIMENT

There is illustrated in FIG. 2 a modified form of invention and specifically in the form of a fishing rod assembly 30 including a first rod section 31 provided with a handle portion 32, and a second rod section 32 releasably attached in end-to-end relation to the first rod section as at 33. The assembly is illustrated as being comprised of conventional guides 34 and fishing line 35 which is fed off of reel 36.

In a manner similar to that of the preferred embodiment of FIG. 1, a battery-powered source 38 is disposed in the handle portion 32 and connected to a timer circuit T as shown in FIG. 3 for operation of light source 40. A motion detector 42 in the form of a piezoelectric crystal is mounted in the first rod section 31, and an on/off switch 44 is interposed between the detector 42 and timer circuit T to permit the light source 40 to be deenergized and not responsive to the motion detector 42 when the rod assembly is not in use.

A plurality of light-transmitting, fiber optic elements 46 are bundled together at one end 47 so that the ends of the elements 46 are directly exposed to the light source 40; and the opposite ends of the elements 46, for example, as designated at A are of different lengths so that when the light source 40 is energized, the light emitted through the fiber optic elements will be visible at their ends A at spaced intervals along the entire length of the rod. If the rod section is transparent, it is sufficient merely to place the elements or strands within the hollow rod and their lighted ends will be visible through the thickness of the rod; however, if the rod is made of an opaque material, the elements 46 should be embedded in the wall of the rod such that their ends are flush with the exterior surface so that the light is transmitted to the exterior surface of the rod.

An important feature of the modified form is utilization of a separate bundle of fiber optic elements 46' in the rod section 32 with an independent light source 40' positioned at the spliced end 33 of the assembly. The light source 40' may suitably include male leads 48 which are inserted into complementary sockets in the end 50 of the first rod section and which is electrically connected via leads 52 to the timer circuit T. Accordingly, the light source 40' will be activated simultaneously with the light source 40 to transmit light through the fiber optic elements along the length of the second rod section 32. Accordingly, it is not necessary to have a second or separate motion detector in order to activate the elements 46' in the second rod section. Although not illustrated, a suitable audible alarm device can be used in the rod assembly as described, such as, a buzzer or bell tone which will be activated by the timer circuit.

It is therefore to be understood that various modifications and changes may be made in the construction and arrangement of elements comprising preferred and modified forms of invention without departing from the spirit and scope thereof as defined by the appended claims.

I claim:

1. In a fishing rod assembly wherein a fishing rod includes a handle at one end and a fishing line is guided for extension along said rod, the improvement comprising:

motion-sensing means in said rod responsive to motion in said fishing line imparted to said rod to generate an electrical signal;

a light source and a portable power supply in said fishing rod;

circuit means in said fishing rod between said portable power supply and said light source responsive to an electrical signal from said motion-sensing means to activate said light source; and a plurality of light-transmitting fiber optic elements extending through said rod having ends of said elements optically aligned with said light source for the transmission of light through said fiber optic elements when an electrical signal is generated by said motion-sensing means.

2. In a fishing rod assembly according to claim 1, said fiber optic elements being of differing lengths for extension along said rod so as to emit light at spaced intervals along the length of the rod.

3. In a fishing rod assembly according to claim 1, said circuit means responsive to said electrical signal generated by said motion-sensing means to generate activating signals at a predetermined flash rate.

4. In a fishing rod assembly according to claim 1, including an audible alarm associated with said circuit means and activated in response to an electrical signal to said circuit means from said motion sensor means.

5. In a fishing rod assembly according to claim 1, including an on/off switch between said motion-sensing means and said circuit means.

6. In a fishing rod assembly according to claim 1, including a pair of fishing rod sections interconnected in end-to-end relation to one another, a light source and a plurality of fiber optic elements in each said section, electrical contact means between connecting ends of said fishing rod sections, and means electrically connecting said circuit means and said contact means whereby an electrical signal produced by said motion-sensing means will activate said light source in each said section.

7. In a fishing rod assembly according to claim 1, said fiber optic elements extending through the interior of said fishing rod having light-transmitting end portions disposed in said fishing rod at spaced intervals along the length of said fishing rod.

8. In a fishing rod assembly according to claim 1, said motion-sensing means being defined by a piezoelectric crystal mounted in said rod in spaced relation to said handle.

9. In a fishing rod assembly according to claim 8, said piezoelectric crystal being in the form of an elongated flexible strip affixed to said fiber optic elements.

10. In a fishing rod assembly wherein a fishing rod includes a handle at one end and a fishing line is guided for extension along said rod, the improvement comprising:

motion-sensing means in the form of a piezoelectric crystal in said rod responsive to motion in said fishing line imparted to said rod to generate an electrical signal;

a light source in said handle;

a portable power supply in said handle;

circuit means in said handle between said portable power supply and said light source responsive to an electrical signal from said motion-sensing means to activate said light source; and a plurality of fiber optic elements extending through said rod having their ends aligned with said light source for the transmission of light through said fiber optic elements when an electrical signal is generated by said motion-sensing means, said fiber optic elements being of differing lengths for extension along said rod, said fiber optic elements extending through the interior of said fishing rod and having light-transmitting end portions at spaced intervals along the length of said fishing rod.

11. In a fishing rod assembly according to claim 11, said circuit means responsive to said electrical signal generated by said motion-sensing means to generate activating signals at a predetermined flash rate.

12. In a fishing rod assembly according to claim 10, including an auditory alarm in said circuit means activated in response to an electrical signal from said motion sensor means.

13. In a fishing rod assembly according to claim 10, including an on/off switch between said motion-sensing means and said circuit means.

14. In a fishing rod assembly according to claim 10, including a pair of fishing rod sections interconnected in end-to-end relation to one another, a light source and a plurality of fiber optic elements in each said section, electrical contact means between connecting ends of said fishing rod sections, and means electrically connecting said circuit means and said contact means whereby an electrical signal produced by said motion-sensing means will activate said light source in each said section.

* * * * *